July 7, 1942.          H. L. LONG          2,288,813
PARKING METER
Filed May 8, 1937          4 Sheets-Sheet 1
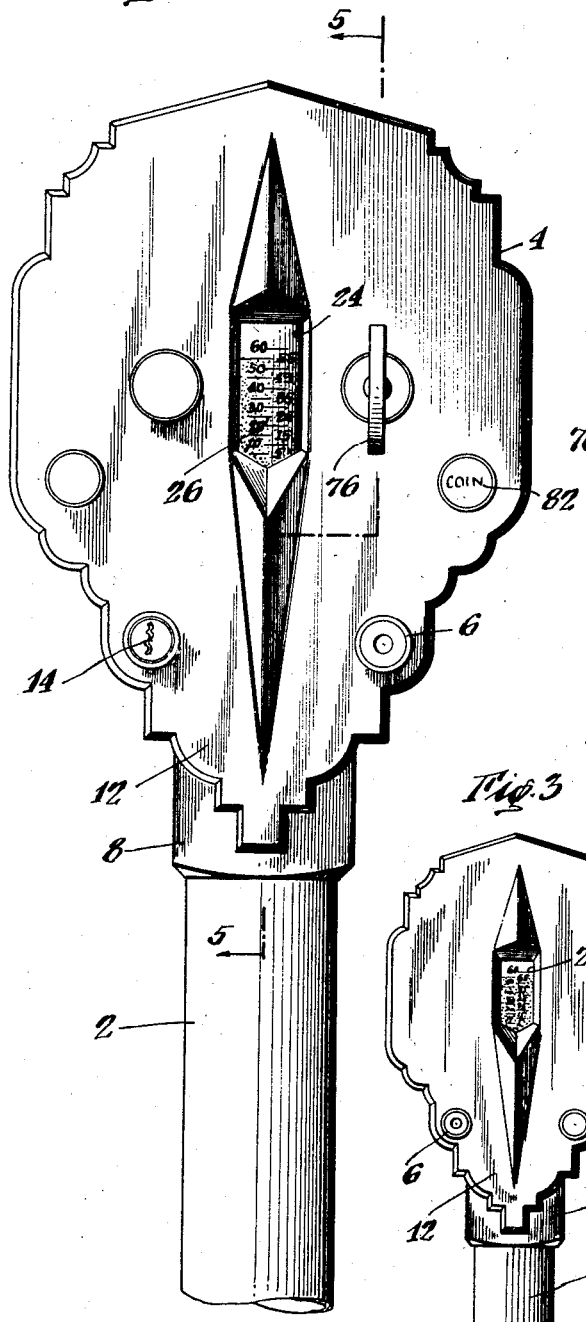
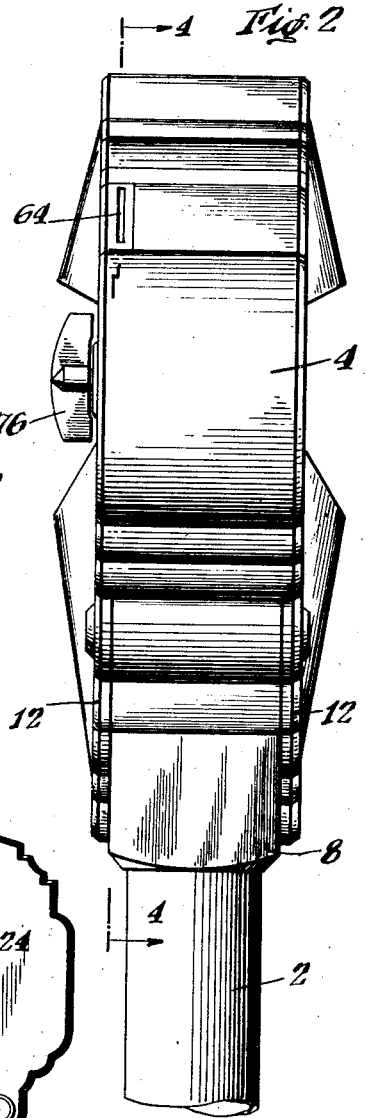
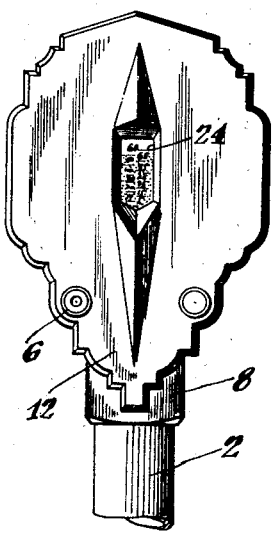
INVENTOR
*Harry L. Long*
BY
*August, Meary & Campbell*
his ATTORNEYS July 7, 1942.   H. L. LONG   2,288,813
PARKING METER
Filed May 8, 1937   4 Sheets-Sheet 2

INVENTOR
Harry L. Long
BY
ATTORNEYS

July 7, 1942.  H. L. LONG  2,288,813
PARKING METER
Filed May 8, 1937  4 Sheets-Sheet 3
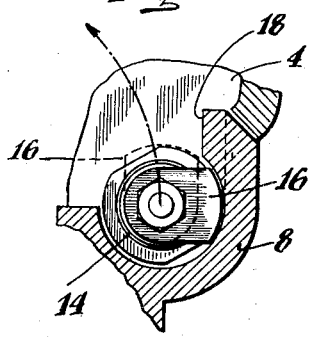
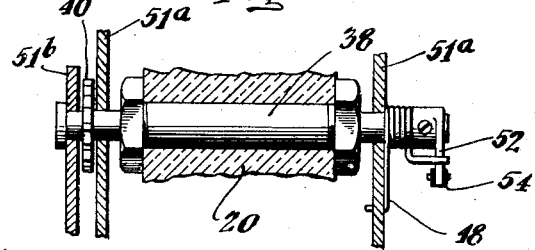
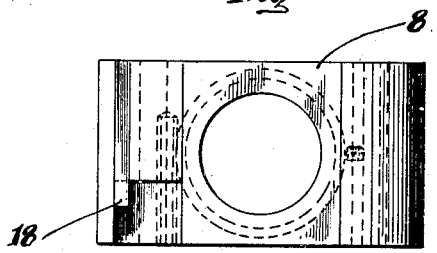
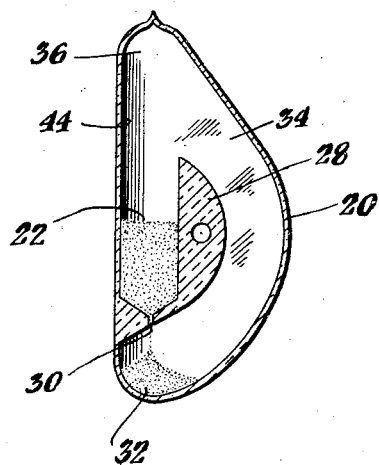
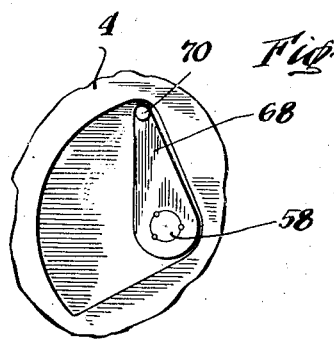
INVENTOR
Harry L. Long
BY
his ATTORNEYS July 7, 1942.                H. L. LONG                2,288,813
                           PARKING METER
                        Filed May 8, 1937            4 Sheets-Sheet 4

INVENTOR
Harry L. Long
BY
ATTORNEYS

Patented July 7, 1942

2,288,813

UNITED STATES PATENT OFFICE 2,288,813

PARKING METER

Harry Lewis Long, Oklahoma City, Okla., assignor, by mesne assignments, to Miller Meters, Incorporated, Chicago, Ill., a corporation of Illinois Application May 8, 1937, Serial No. 141,491

4 Claims. (Cl. 161—15)

This invention relates to timing devices, such as parking meters or the like, and particularly to timing devices, the operation of which is initiated or controlled by inserting a coin or check. The present application is a continuation in part of my co-pending application Serial No. 58,385, filed January 9, 1936, now abandoned.

Parking meters and similar constructions as heretofore made have embodied timing elements in the form of spring or electrically driven clockwork mechanism or mechanism driven by means of weights and escapements for indicating the lapse of time or for actuating signals or the like upon the expiration of a predetermined period. Since parking meters are ordinarily located in exposed positions and subjected to varying atmospheric conditions, the timing elements employed even though protected by a housing, are to a more or less extent subject to the action of rain, humidity and the fumes and smoke of cities, as well as wide ranges of temperature. These conditions tend to promote rusting and deterioration of the timing elements rendering them unreliable in operation so that frequent repair or replacement of the elements is necessary.

The timing device of the present invention includes as a novel feature of the construction a timing element located in a sealed chamber which excludes moisture and may be evacuated if desired, whereby the effects of rain, floods, gas fumes and extreme heat or cold do not detrimentally affect the accuracy of the timing operation. The invention also includes, in combination with such a timing element, mechanism for controlling the operation of the timing element adapted to be reset at any time to initiate a new timing operation of predetermined duration. The invention also includes means for deterring the use of an unexpired parking period by one not paying for or otherwise complying with the rules governing the exercise of the parking privilege. Among other novel features of construction more fully hereinafter described and claimed, the invention includes novel actuating means whereby shock to the timing element and related parts of the mechanism is eliminated or minimized, thus prolonging the life of the mechanism and insuring uniform operation.

In those embodiments of the invention hereinafter described and illustrated in the drawings, the timing element is shown as embodying the principle of the hour glass in that the timing element includes a closed container or chamber holding a material flowable from one portion of the container or chamber to another under the influence of gravity. Certain features of this timing element are believed to be broadly new and are so claimed. It will be understood, however, that the invention in its broader aspects is not confined to the particular type of timing element shown; and that various equivalents may be employed in the novel combination disclosed.

One of the objects of the present invention is to provide a novel type of timing device, such as a parking meter, which is operable consistently and in a reliable manner under all conditions of use.

Another object of the invention is to provide a parking meter with a novel type of timing means protected from the action of moisture, fumes and external influences which might injure or affect the operation thereof.

Another object of the invention is to provide a parking meter with timing means enclosed within a sealed chamber and adapted to be reset at any time to initiate a new timing operation of predetermined duration.

A further object of the invention is to provide a parking meter with means for preventing shock to the elements thereof in resetting, whereby consistent and uniform operation is assured.

Another object of the invention is to provide a parking meter which deters the use of an unexpired parking period by those failing to pay for the privilege.

These and other objects and features of the present invention will appear from the following description thereof, in which reference is made to the accompanying figures of the drawings illustrating typical embodiments thereof.

In the drawings:

Figure 1 is a front elevational view of the meter;

Figure 2 is a side elevational view of the meter;

Figure 3 is a rear elevational view on a smaller scale;

Figure 8 is a detail view taken substantially on the line 8—8 of Figure 5;

Figure 9 is a fragmentary detail sectional view showing the pivot mounting for the timing element;

Figure 10 is a top plan view of the meter supporting head;

Figure 11 is a vertical sectional view through the timing element;

Figure 12 is a detail view taken substantially on the line 12—12 of Figure 5;

Figure 4:
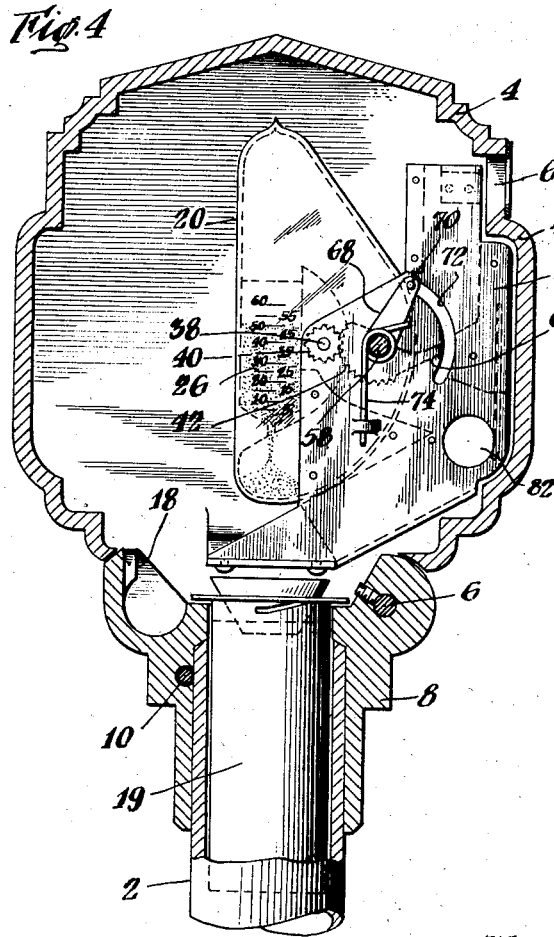
Figure 4 is a sectional view taken substantially on the line 4—4 of Figure 2.
Figure 5:
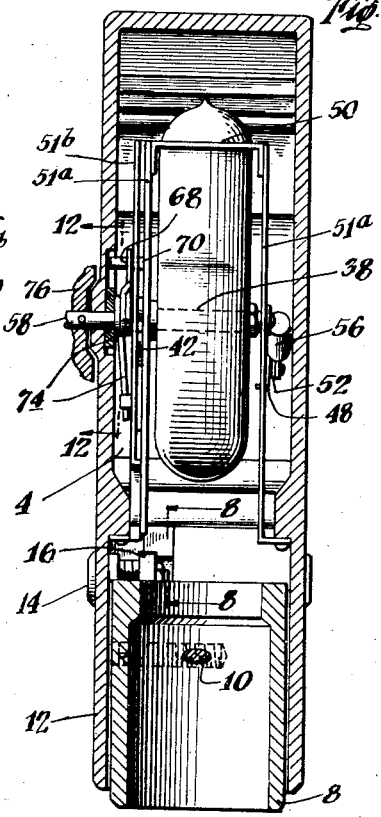
Figure 5 is a part sectional view and part side elevation, the section being taken substantially on the line 5—5 of Figure 1, and the elevation showing the timing element and associated parts.
Figure 7:
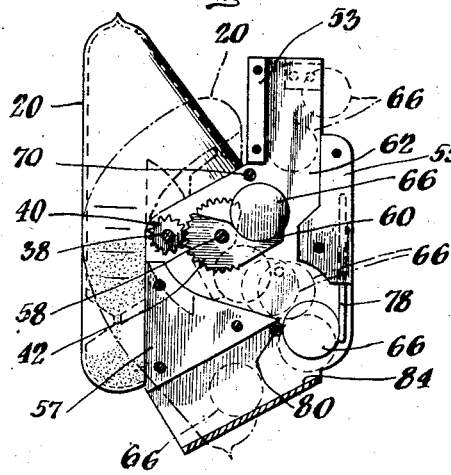
Figure 7 is a view partly in section and partly in elevation and showing the timing element with certain of associated parts removed as viewed from the side opposite to that shown in Figure 6.

In that embodiment of the invention shown in Figures 1 to 12, inclusive, the parking meter is supported by a standard or post 2 on the upper end of which is located a housing 4. The housing may be of any desired shape or construction but as shown is pivotally secured at 6 to a support 8 fixedly attached to the upper end of standard 2 by suitable means, such as a screw 10. The head of the screw is normally concealed by an apron 12 projecting downward from the pivoted housing 4 but is accessible when the housing is tilted about the pivot 6.

A lock 14 is carried by the housing and is provided with a bolt 16 or the like which normally projects below a keeper 18 on the support 8, as shown in Figure 8, to prevent tilting of the housing. On rotation of the bolt to the dotted line position of Figure 8 the housing may be tilted to expose screw 10 and to permit access to a coin receiving receptacle 19 located in the support 8 and projecting downward into the standard 2.

Within the housing 4 is located a suitable timing element which as illustrated is in the form of a sealed chamber 20 containing flowable material 22, such as sand or a liquid, for measuring the time expired after initiation of a timing operation. A portion of the timing element designed to hold the time measuring material is located during a timing operation adjacent a sight opening 24 in the housing and graduations 26 may be provided on the element or in the sight opening to indicate the time which has elapsed since the starting of a timing operation.

When used as a parking meter the timing element should be capable of being actuated at will to initiate a new timing operation of predetermined duration without waiting for the termination of a previous timing operation. In the construction illustrated in Figures 4 and 11 the timing element is shown to embody a hermetically sealed container 20 formed of glass or other transparent material and having a dividing wall 28 therein defining a draining chamber 29 from which the material 22 drains through a small opening 30 at a predetermined rate. Below the draining chamber there is a receiving chamber 32 communicating through a large passage 34 with the upper portion 36 of the container and the open upper end of the draining chamber 29.

The container 20 is mounted for movement on a shaft 38 having a gear 40 thereon meshing with a gear segment 42. On operation of the gear segment the gear 40 and shaft 38 are rotated to move the container 20 in a counterclockwise direction, as seen in Figure 4, through a half-revolution to the dotted line position of Figures 6 and 7. During this movement material which has drained through the draining opening 30 and collected in the receiving chamber 32 of the container passes rapidly downward over the sloping lower surface of the wall 28 and through the large passage 34 into the lowered upper portion 36 of the container. Upon rotation of the chamber from the dotted line to the full line position of Figures 6 and 7 in a clockwise direction, the material flows downward over the surface 44 of the container and into the open upper end of the draining chamber 29. In this way a new timing operation is initiated. Thereafter material drains slowly through the draining opening 30 until the expiration of the timing operation, when all of the material will have drained from the chamber 29 into the receiving chamber 32, or until the timing element is again shifted to a reversed position to initiate a new timing operation.

Figure 6:
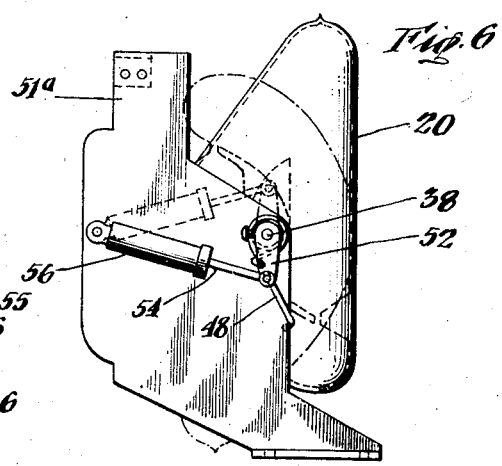
Figure 6 is a side elevational view of the timing element and associated parts as viewed from the right hand side of the device as shown in Figure 5.

Any suitable means may be employed for actuating the timing element to initiate a timing operation. The movement or rotation of the container to an inverted position in which the receiving chamber 32 is raised above the portion 36 of the container may advantageously be effected manually, whereas the reverse movement for restoring the flowable material to the chamber 29 may be effected mechanically or otherwise and in a controlled manner so that material will not be thrown out of the draining chamber and the mechanism will not be subjected to shock due to too vigorous manipulation of the device. The means provided for controlling such return movement of the timing element may take various forms, but as shown, spring means energized by manual operation of the device in inverting the container are employed and a dashpot or other dampening means is provided for cushioning the action of the spring means. The spring 48 employed for this purpose is shown in Figure 6 as coiled about shaft 38 to which the gear 40 is secured. One end of the spring is secured to the arm 52 and the other end bears against the frame 50 by which the shaft is supported. The arm 52 fixed to the end of a shaft 38 is connected by link 54 to a piston movable in the pivoted cylinder 56 forming a dashpot to control the return movement of the container 20 under the action of spring 48.

The means illustrated in Figures 4 to 7 for moving the timing element to an inverted position to terminate a timing operation are manually operable and include the gear 40 secured to shaft 38 on which the timing element is mounted and the gear segment 42 with which the gear 40 meshes. The gear segment 42 is loosely mounted on a shaft 58 mounted in frame 50 and has a coin engaging arm 60 projecting therefrom into a coin passage 62. The housing is provided with a coin slot 64 through which a coin or check for operating the device may be inserted into the coin passage 62 defined between the adjacent side members 51a and 51b of the frame 50. Spacing pieces 53, 55 and 57 are held between the members 51a and 51b and also serve to define marginal limits of the coin passage as shown more particularly in Figure 7. A coin 66 inserted in the slot in passing downward through the passage 62 comes to rest in engagement with the arm 60 of gear segment 42.

An operating arm 68 is also mounted on the shaft 58 and is provided with a pin 70 projecting through a slot 72 in the frame 50 and into the coin receiving passage 62. The arm 68 is normally retained in its uppermost position, as shown in Figure 4, by means of a spring 74, so that the pin 70 does not interfere with the passage of a coin from the slot 64 through the passage 62 and into engagement with the arm 60 on segment 42. A handle 76 is secured to the shaft 58 and located on the exterior of the housing so as to be manipulated by the user.

In operating the mechanism described, the user inserts a coin 66 in the slot 64 so that it passes downwardly through the passage 62 and comes to rest in engagement with the arm 60 on gear segment 42. Thereafter on rotation of the handle 76 the arm 68 is rotated moving the pin 70 downward into engagement with the coin 66. Further rotation of the handle moves the coin 66 and the arm 60 of the gear segment 42 downward so that the gear 40 is rotated and the shaft 38 and the timing element 20 are moved from the full line position of Figure 7 to the dotted line position shown therein. The handle 76 can be rotated no further, due to the engagement of the pin 70 with the end of the slot 72 so that the operator naturally releases the handle, whereupon the spring 74 returns the arm 68, the shaft 58 and the handle 76 to their normal positions in which the pin 70 engages the upper end of the slot 72, as shown in Figure 4. Movement of the pin 70 away from the coin 66 also permits the coin to pass downward into engagement with a spring member 78 which serves to hold the coin against a stud 80 and in position to be observed through a sight opening 82 in the housing.

On return movement of pin 70 and displacement of coin 66 the gear segment 42 is released and the timing element is reversed relatively slowly by means of the spring 48 under control of the dashpot 56, preventing shock on the mechanism and insuring the proper flow of material from the lowered upper portion 36 of the chamber into the draining chamber 29 to initiate a new timing operation of predetermined duration. The sand or other material 22 then drains from the chamber 29 and its level therein is observable through the sight opening 24 to indicate the extent of time that has elapsed in the timing operation. The sand continues to drain from the draining chamber until the timing operation is completed and all of the sand has passed into the receiving chamber or until such prior time as the device is operated again by the insertion of another coin. Upon insertion of a new coin the coin previously held adjacent the opening 82 by the spring 78 and stud 80 is displaced by the new coin and passes through a chute 84 into the coin receptacle 19. Thus, the coin used to actuate the device is held in an exposed position and acts as a deterrent to the use of slugs or improper operating means for the device.

The parking meter described above and shown in Figures 1 to 12 of the drawings is characterized by the fact that it requires no attention, except to remove the accumulated coins or checks, and is entirely self-contained; that is, the provision of external means, such as electrical conduits in the curbing or adjacent structure is not required for the operation of the device, and it may be removed from one location to another without difficulty and as occasion demands. Furthermore the device as described is permanently operable in that it needs no winding or adjustment and no batteries or other elements need be replaced or renewed to insure consistent and satisfactory operation. Moreover, climatic conditions, rain, cold and even submersion, as in times of flood, have no effect or influence on the operation of the device so that when once installed it will continue to remain operative at all times and under all conditions of use.

Figure 13:
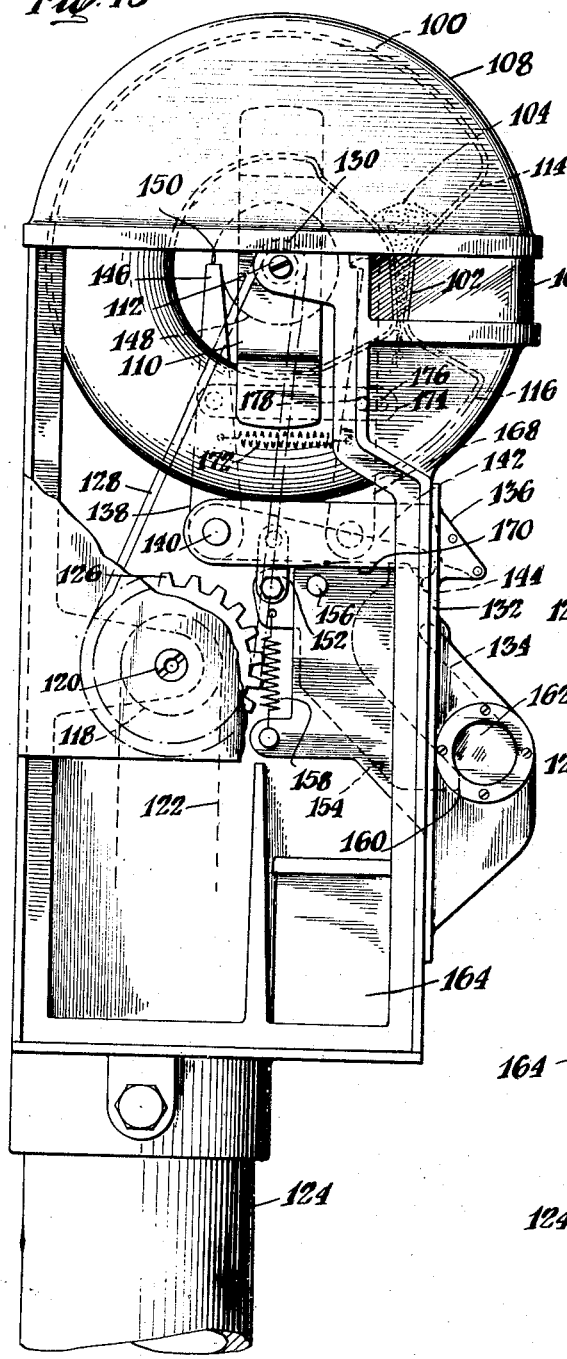
Figure 13 is a front elevation of a modified construction embodying the present invention with a part of the housing broken away.
Figure 14:
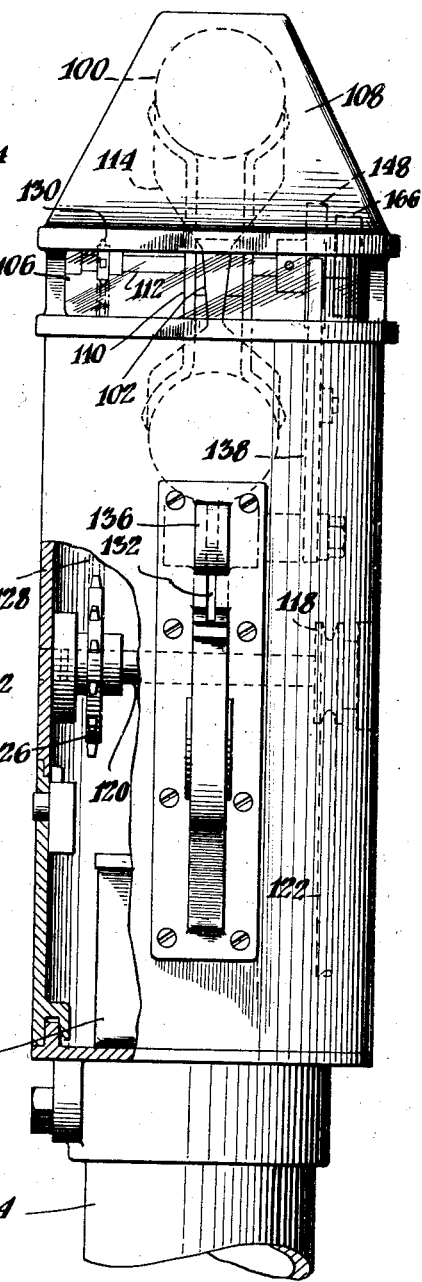
Figure 14 is a side elevation of the construction shown in Figure 13 with a part of the housing broken away.

It will be evident that the invention may take various forms and various types of actuating means may be employed for operating the device. Another embodiment of the invention is illustrated in Figures 13 and 14, wherein the timing element is in the form of a chamber 100 of generally ring shape, with a restricted portion 102 through which the material 104, such as sand, liquid or the like may flow at a predetermined rate. The restricted portion preferably presents a relatively long tapered passage which during a timing operation is located adjacent a sight opening 106 in the housing 108. Thus only a relatively small portion of the timing element is observable through the opening, and it is impossible to determine the amount of unexpired time remaining from a previous timing operation. Persons wishing to occupy a parking area before the expiration of a previous parking period, therefore, cannot determine how much of the previous parking period remains unexpired and will not drive about in an attempt to select a parking area which has been vacated while a substantial part of the allowed parking period remains.

Preferably the sight opening is formed to extend about three sides of the housing so that the presence or absence of the timing material in the restricted portion of the element may be readably observed by all passing on the sidewalks or adjacent the device and failure of an operator to actuate the meter and insert the prescribed coin or other check or token can be readily observed.

The timing element is supported in the housing by clamping members 110, secured to a shaft 112 and is adapted to be rotated through one complete revolution to initiate a new timing operation. On rotation of the timing element in a counterclockwise direction, as seen in Figure 13, it will be apparent that the upper draining portion 114 of the chamber will first be inverted and then righted while the sand or other material contained in the receiving portion 116 of the chamber will remain in the lowermost portion of the chamber as it is rotated and until picked up by the holding portion and elevated above the sight opening to an operating position. Thus a timing operation may be terminated and a new operation of predetermined duration may be initiated at any time by simply rotating the chamber 100 through one complete rotation in a counterclockwise duration.

The means employed for rotating the timing element to initiate a new timing operation may be of any suitable type. That shown in Figures 13 and 14 is wholly automatic, requiring no manual operation other than the insertion of a coin. This insures uniformity of operation and prolongs the life of the mechanism by avoiding the shocks and irregularities in movement that may occur with manually operated devices. The construction shown includes a pulley 118 secured to a shaft 120 and driven by suitable means such as a belt 122, to which a weight or other means movable in standard 124 may be secured. The shaft 120 has a sprocket 126 secured thereto over which passes a chain 128 which also passes over a sprocket 130 on the shaft 112, by which the timing element is rotated. The driving means for actuating the shaft 120 and the timing device may be energized periodically by inserting a suitable crank or key through an opening in the housing and into engagement with a key slot in shaft 120 for raising a weight or winding a spring or other means provided for actuating the driving means.

The operating means may advantageously be released automatically on insertion of a coin and without further manipulation by the operator. For this purpose the housing 100 is provided with a coin receiving opening 132 communicating with a coin passage 134. The opening 132 through which the coin is inserted preferably is covered by a downwardly extending hood 136 or is downwardly directed to prevent the entrance of rain, dirt, or moisture into the coin opening. A bell crank 138 is pivoted at 140 within the housing and is provided with an actuating arm 142, the end 144 of which extends into the coin passage adjacent the coin opening 132. The opposite arm 146 of the bell crank constitutes a latching member that extends upward from the pivot 140 and into engagement with a positioning member 148 on shaft 112. The positioning member is formed with a projection 150 located to hold the timing element in position with the restricted portion 102 thereof adjacent the sight opening 106.

The actuating arm 142 of the bell crank is connected by a link 152 to a coin retaining member 154 pivoted at 156. A spring 158 urges the member 154 in a counterclockwise direction, as seen in Figure 13 and acts through link 152 to urge the end 144 of the actuating arm of the bell crank into the coin passage 134 and to urge the latching arm 146 of the bell crank against the positioning member 148 so that it will be engaged by the projection 150. The lower end 160 of the retaining member 154 is urged outward by the action of spring 158 and serves to hold the coin used in operating the device in position adjacent a sight opening 162 so that the use of a slug or improper operating member may be readily observed.

In the operation of the mechanism described the insertion of a coin into the opening 132 serves to raise the end 144 of the actuating arm 142 and in so doing serves to retract the latching arm 146 from engagement with the projection 150 on the positioning member 148. The timing element is thus released and is rotated by operation of the driving means for rotating shaft 120, chain 128 and shaft 112, to which the timing element is secured. The movement of the actuating coin past the end 144 of the actuating arm permits the latching member to again move into engagement with the positioning member under the action of spring 158, so that the timing element is allowed to make only one complete rotation, at the end of which the projection 150 engages the end of the latch arm 146 and the restricted portion 102 of the timing element is restored to its position adjacent the sight opening 104.

The material which has previously been drained from the upper portion of the chamber 100 through the restricted portion thereof is thus returned to the upper portion of the chamber 100, so as to again drain through the restricted portion in a new timing operation.

After the coin used in actuating the device has passed the downwardly turned end 144 of the arm 142, it passes through the coin passage 134 and is held in position adjacent the coin sight opening 162 by the lower end 160 of the coin retaining member 154 as the end is urged outward toward the sight opening by the spring 158. The coin is thus held in position to be observed during the timing operation and until a new timing operation is started. However, upon insertion of another coin to start a new timing operation, the actuating arm 142 is raised, causing the link 152 to pull upward on the rear of the coin retaining member against the action of the spring 158 so that the end 160 of the coin retaining member is moved to the left as seen in Figure 13, releasing the previous coin so that it may pass downward into a coin receptacle 164. When the newly inserted coin passes the end 144 of arm 142, the spring 158 returns the lower end 160 of the coin retaining member to its coin retaining position to hold the new coin adjacent the sight opening 162.

The coin receptacle employed preferably is in the form of a sealed container having a slot for receiving the coins, or it may be otherwise constructed to prevent unauthorized removal of coins therefrom. The shaft 112 by which the timing element is rotated also may be provided with an operation counter of an irreversible type for indicating the number of operations of the device so as to act as a check on the collector and to determine the value of maintaining a parking meter in a particular location. Such a counter is shown at 166 in Fig. 14.

In order to safeguard the mechanism against accidental or mischievous operation that might cause the latch arm 146 to be held away from the projection 150, on the positioning member 148 so as to allow the driving means for the timing element to operate continuously or until run down, a supplemental latch member 168 is pivotally mounted on the frame 170 and is movable into position to engage projection 150. A spring 172 is connected between the latch arm 146 and the supplemental latch member and urges the member 168 toward the positioning member 148. However, a link 174, carried by the latch arm, normally serves to hold the supplemental latch member away from the positioning member 148 so that during normal operation of the device in which the latch arm 146 is urged against the positioning member by the spring 158, the supplemental latch member is held away from the positioning member and does not engage the projection 150.

With this construction if an object is inserted into the coin slot to engage the end 144 of the actuating arm 142 and is held in position to prevent the latch arm 146 from engaging the projection 150, the supplemental latch member 168 will then be allowed by the link 174 to swing to the left, as seen in Fig. 13, and will be urged against the positioning member 148 by the spring 172 so that it will engage the projection 150 and prevent rotation of the timing element through more than one-half of a complete revolution. Thereafter when the latch arm 146 is permitted to return into engagement with the positioning member 148 by removal of the object used to manipulate the mechanism, the link 174 will move to the right with the latch arm 146 under the action of spring 158 and will swing the supplemental latch member out of engagement with the projection 150 and permit the timing element to continue its rotation until restored to its timing position in which the projection 150 engages the latch arm 146.

The timing operation which follows such improper manipulation of the device will take place in a normal manner, but the coin, which previously was retained in the sight opening 162, will have been released by the raising of the actuating arm 142 so that no coin will be present in the sight opening and it will be apparent that the timing operation has been improperly initiated.

Since the latch arm 146 and coin-actuating arm 142 are actuated by the operator on insertion of a coin it is desirable that they be easily movable. In some cases their movement may be greater than that required to move the supplemental latch member 168 into position to engage the projection 150 and therefore the link 174 is provided with a slot 176 for receiving a pin 178 on the supplemental latch member, so that movement of the latch arm 146 on insertion of a coin into the device will not be limited by the supplemental latch member but may take place easily against the action of the light spring 172.

The form of the invention illustrated in Figures 13 and 14, like that illustrated in Figures 1 to 12, inclusive, is unaffected by the action of moisture, fumes or climatic conditions so that consistent and reliable operation thereof is assured. It will be apparent however that the timing means may take other forms and other types of operating and actuating mechanism than those described herein and illustrated in the drawings may be used in the practice of the invention. It should, therefore, be understood that the above description and showing is intended to be illustrative of typical embodiments thereof and is not intended to limit the scope of the invention.

I claim:

1. In a parking meter, a timing device comprising a draining chamber, a receiving chamber and a return by-pass, said draining chamber being adapted to contain a flowable material and to permit it to drain therefrom into said receiving chamber at a predetermined rate, mechanism for shifting the position of said timing device to quickly return flowable material present in said receiving chamber through said by-pass to said draining chamber to permit initiation of a new timing operation, means including a spring for storing energy in response to actuation of said mechanism capable of returning said device to time measuring position, and dashpot means for retarding the speed of return of said device to said position to prevent shock to said timing device.

2. In a parking meter, a sealed chamber having gravity actuated timing means therein, means including a power storage device for moving said chamber to raise said gravity actuated means and initiate a timing operation, means operable at will to effect a storage of energy in said power storage means and permit said power storage means to return said gravity actuated means to time operating position, and means including a dashpot for retarding the rate of movement of said chamber as said chamber approaches said time operating position.

3. In a parking meter having a casing with a sight opening therein, a timer of the sand glass type having normally upper and lower chambers located in said casing and observable through said opening, said timer being provided with a medium having free flowing characteristics and flowable at a predetermined rate from said upper chamber to said lower chamber to effect a timing operation of a predetermined duration, said timer having a chamber thereof graduated to indicate lapse of time according to flow of said medium, means including a spring operable normally to hold said timer substantially stationary in timing position for view through said sight opening, means operable at will for moving said timer against the action of the spring to restore said medium to said upper chamber to initiate a timing operation of predetermined duration, and said spring being operable when the timer is released to effect the return of said timer to timing position.

4. In a parking meter, a chamber having gravity actuated timing means therein, a shaft for revolvably supporting said chamber, a stop, control means including a spring operatively associated with said shaft for normally maintaining said chamber in timing position adjacent said stop, reset means operable at will to move said chamber against the action of said spring to shift the position of said gravity actuated timing means in said chamber preparatory to initiation of a new timing operation of predetermined duration, and said spring being so arranged that upon release of said reset means it will operate to return said chamber to position adjacent said stop to initiate a timing operation.

HARRY LEWIS LONG.